June 4, 1935. J. E. BALES ET AL Re. 19,596

TABLE LEG CONSTRUCTION

Original Filed Aug. 9, 1929 2 Sheets-Sheet 1

Inventors:
James E. Bales
Carl T. Christensen
By:- Cox & Moore attys.

June 4, 1935. J. E. BALES ET AL Re. 19,596

TABLE LEG CONSTRUCTION

Original Filed Aug. 9, 1929 2 Sheets-Sheet 2

Inventors:
James E. Bales
Carl T. Christensen
By:- Cox & Moore Attys

Reissued June 4, 1935

Re. 19,596

UNITED STATES PATENT OFFICE 19,596

TABLE LEG CONSTRUCTION

James E. Bales and Carl T. Christensen, Aurora, Ill., assignors to Lyon Metal Products, Incorporated, Aurora, Ill., a corporation of Illinois Original application August 9, 1929, Serial No. 384,582. Patent No. 1,860,644, dated May 31, 1932. Divided and application June 20, 1930, Serial No. 462,607. Patent No. 1,917,916, dated July 11, 1933. Application for reissue January 9, 1935, Serial No. 1,026

29 Claims. (Cl. 311—99)

This invention relates to tables in general and particularly to tables having legs which fold beneath the top of the table.

The present invention is a division of application Serial No. 384,582, filed August 9, 1929, now Patent No. 1,860,644, May 31, 1932.

The primary object of the invention is to provide a table having new and improved folding legs which are automatically locked in position when the legs are extended.

Another object of the invention is to provide a folding leg construction for a table wherein locking means is provided for the leg which includes a member shiftable parallel to the longitudinal axis of the leg into locking engagement with the cooperative locking member on the table when the leg is pivotally swung to open position and preferably including resilient means mounted within the leg for automatically bringing about the locking engagement when the leg is swung to open position together with manually actuatable means for forcibly moving the shiftable locking member out of engagement with its cooperative locking member.

Yet another object of the invention resides in providing a locking construction for a pivotally mounted leg of a table wherein at least the upper portion of the leg is formed hollow or is provided with an opening for housing a locking member and for housing spring means for automatically shifting the locking member into engagement with the cooperative locking member of the table when the leg is in unfolded condition whereby the locking member is hidden and compactly arranged with regard to the leg structure.

Yet another object of the invention resides in providing a leg locking mechanism for a table having a pivoted leg wherein the leg member is formed of two relatively movable members, the outer member forming the housing for the inner member together with suitable latching means carried by one of said members and normally spring-pressed into locking engagement with the cooperative locking member on the table when the leg is swung to open position, and including means manually actuatable to withdraw the shiftable locking means from locking engagement with the cooperative locking means.

Yet another object of the invention is to provide a locking construction for a table having a pivoted leg wherein the leg carries a locking lug adapted to be normally spring pressed into locking engagement with a socket in the table and wherein the shiftable locking means is forcibly withdrawn from engagement with its socket by manually actuated means.

Another object of the invention resides in providing a specific unlocking means which comprises a construction whereby the table leg, upon being given a partial rotation, accomplishes the withdrawal of the locking leg from its socket.

Another object is to provide in a table having walls, legs which are locked in position when the legs are extended and which may be unlocked when the legs are given a part turn.

A further object is to provide a folding table which is provided with interengaging means for locking the table legs in extended position and which is provided with means for unlocking the legs when the legs are given a partial turn.

A further object is to provide a table having a support to which the table legs are pivotally attached, said legs comprising a sleeve portion and a leg portion. Spring means are provided for urging the leg portion in one direction relative to the sleeve portion for locking the leg in extended position. Means are also provided for urging the leg in an opposite direction when the leg portion is given a partial turn.

A further object is to provide the method of making table legs which consists in inserting a spring having a free end leading through the spring, providing a hole in a closed end of a member through which the free end of the spring extends, compressing the spring by pulling the free end, passing fastening means through said member to maintain the spring in compression, and finally cutting the free end of the spring and restricting the spring between the fastening means and the closed end of the member.

The objects and advantages will appear throughout the progress of the specification.

The invention comprises in general a table having rails which are made from a single strip of sheet metal. The rails are bent to provide inwardly extending legs which are perpendicular to the vertical plane of the rails. These legs are arranged below the table top substantially the same distance as the thickness of the top. Corner pieces have reduced ends which fit into the open ends of the rails and are fastened thereto so that the outside of the rails will be flush with the outside of the corner pieces. The corner pieces have parallel flanges provided on their bottoms to which legs are pivotally attached. The legs comprise a sleeve portion and a leg portion received in the sleeve portion. A spring is concealed inside of the leg portion, and fastening means extending through the flanges on the corner pieces and through the sleeve and leg portions confine the spring between the fastening means and the top of the leg portion. The leg portion is provided with diagonal slots for retracting the normally projecting pin or locking member on the end of the leg portion when the leg portion is given a partial turn. A socket is provided in each corner piece to receive this pin when the leg is in extended position. To fold the legs it is first necessary to give the leg portion a partial turn which will bring the pin out of engagement with the socket.

Further, our invention broadly consists in forming a locking mechanism for the pivoted leg portion of a folding table wherein the leg is arranged to carry a locking member adapted to be projected automatically and preferably by means of a spring housed within the leg, into locking engagement with a cooperative locking member on the table, preferably formed as a socket on the underside of the table or table frame, wherein when the leg is swung to open position, the locking member will be automatically projected into locking engagement. In addition, our invention includes a construction wherein the locking member, when it moves into locking engagement with the cooperating locking member on the table, shifts parallel to the longitudinal axis of the pivoted leg when the latter is in its open position.

Our invention further includes a construction wherein the shiftable member is housed within a leg structure or a portion of the leg structure whereby the locking mechanism is rendered substantially hidden. In addition, our construction includes manually actuatable means for forcibly retracting the shiftable locking mechanism from locking engagement with its cooperative locking mechanism and the preferred embodiment of such a manually shiftable unlocking construction includes a provision for utilizing a turning or rotative movement of a portion of the table leg itself in accomplishing this.

The accompanying drawings illustrate a selected embodiment of the invention and the views therein are as follows.

Figure 1:
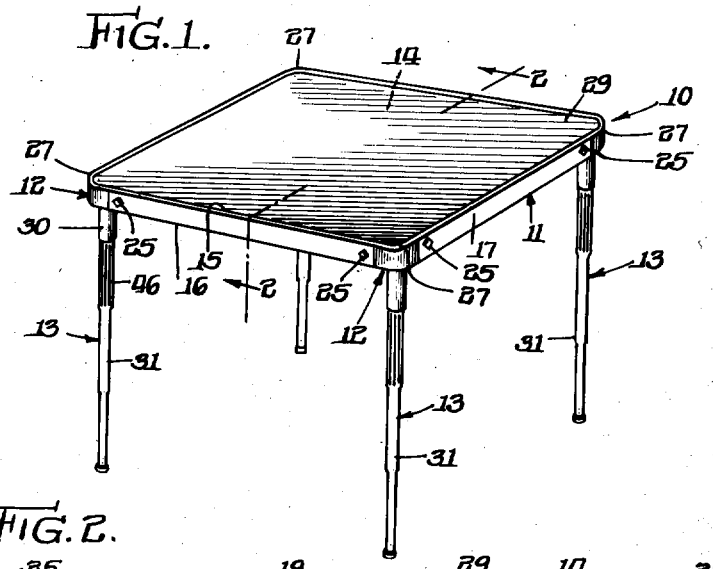
Fig. 1 is a detail perspective view of the improved table.

Referring to the drawings, 10 designates generally a table having rails 11, which are fastened to corner pieces 12. Legs 13 are pivotally connected to the corner pieces 12 and a top 14 is recessed between the rails and supported by the rails and the corner pieces.

Figure 8:
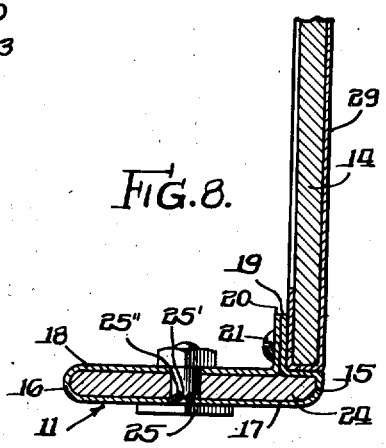
Fig. 8 is a detail sectional view on the line 8—8 of Fig. 5.

The rails 11, Fig. 8, are made from a single strip of sheet metal and bent to provide the top and bottom 16 and 16 and the sides 17 and 18 respectively. The free edges 19 and 20 extend below the top edge 15 of the rail a distance substantially equal to the thickness of the top 14, and are substantially perpendicular to the normal vertical plane of the rail. Screws or other fastening means 21 extend through the free edges or legs 19 and 20 and engage the top 14.

Figure 5:
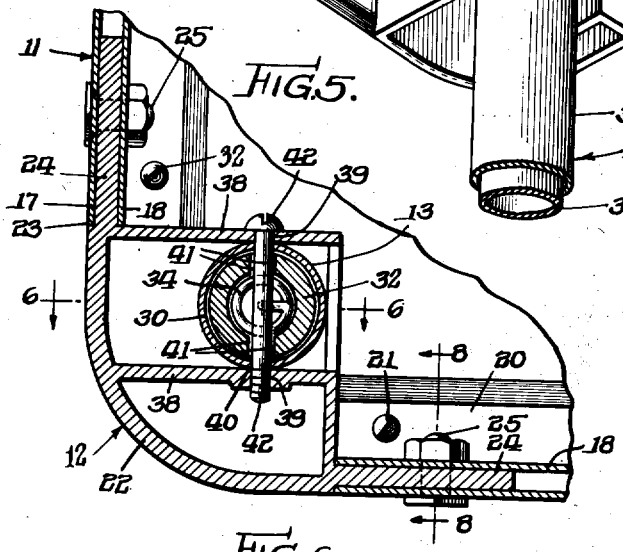
Fig. 5 is a detail sectional view on the line 5—5 of Fig. 4.

The corner pieces 12, Fig. 5, have rounded outer edges 22 and are recessed at 23 to provide the reduced legs or flanges 24. These reduced legs fit into the end of the rails and are fastened thereto by means of bolts or other fastening means 25. The bolts 25 have an ornamental front face and are provided with teeth 25', Fig. 8, and force the metal of the rails as indicated at 25'' into a corresponding depression formed in the legs or flanges 24 of the corner member. When the nut on the bolt 25 is tightened the sides 17 and 18 of the rails are forced against the face of the leg or flange 24 causing the outer face of the side 17 of the rails to seat in the reduced portion of the corner piece and be substantially flush with the outside thereof. These corner pieces have an inwardly extending flange 26, Figs. 6 and 7, which is located below the top edge 27 of the corner pieces a distance substantially equal to the thickness of the top 14. These flanges have their top edges 28 substantially flush with the top of the edges or legs 19 of the rails 11. The top 14 which may be of laminated construction has a decorative leather or other similar covering 29 which is arranged between the rails and corner pieces and supported by the legs 19 and 20 of the rails and the flanges 26 of the corner pieces.

The table top construction and the manner of forming the rails and other construction relating to the table top is disclosed and claimed in the aforesaid copending application and is merely inserted herein for the purpose of describing the manner in which the particular leg construction herein disclosed and claimed may be connected to the table top.

Figure 6:
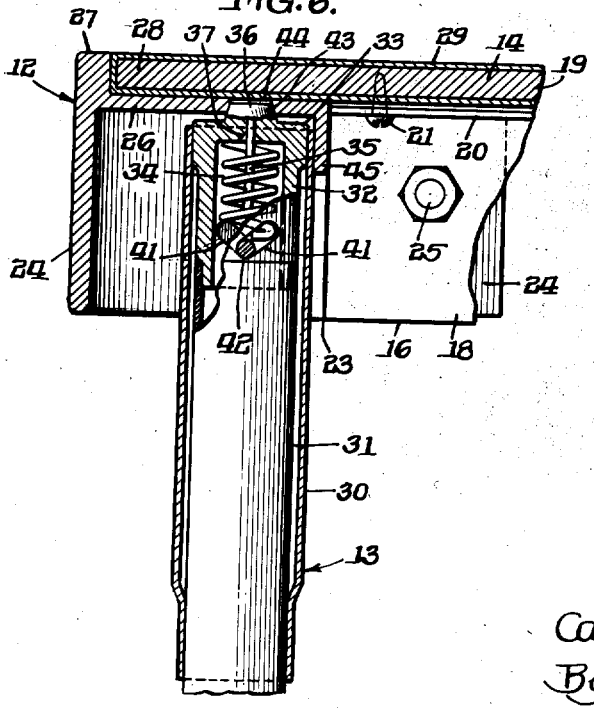
Fig. 6 is a detail sectional view on the line 6—6 of Fig. 5 showing the leg in extended locked position.
Figure 7:
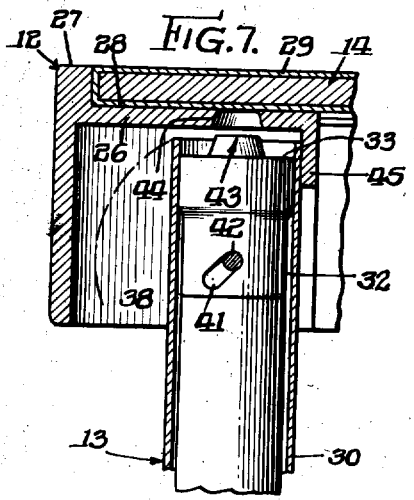
Fig. 7 is a similar view showing the leg in receded or unlocked position.

By reference to the drawings it will be seen that the legs 13, Figs. 4 to 7, each include or are made up of a hollow, elongated member or sleeve 30 and a leg portion proper 31, the upper portion of which telescopes and is housed by the outer sleeve 30. A separate fitting or other member 32, Figs. 5 and 6, is provided with a closed top 33, Fig. 7. This fitting 32 is securely fastened by any appropriate means to the leg portion 31 and carries a coiled expansion spring 34, Fig. 6. The spring 34 has a straight free end 35 which is integral with the bottom coil of the spring and returns upwardly through the center of the spring. The spring is located in position by dropping it into the bottom of the leg when the leg is in inverted position. The free end 35 extends through a hole 36 provided in the top 33 of the member 32. The hole 36 may be countersunk at 37 to facilitate the straight free end 35 of the spring in finding the hole 36. The corner members 12 have integral spaced arms 38, Fig. 5, formed on the bottom thereof and have oppositely alined circular holes 39, Fig. 5. The sleeve 30 is also provided with oppositely alined circular holes 40, while the fitting 32 is provided with diagonal slots 41. The legs 13 are mounted between the arms 38 and pivoted thereto by means of a bolt or other fastening member 42, Fig. 5, which passes through the circular holes 39 and 40 in the arms and sleeve respectively and through the diagonal holes or slots 41 in the fitting 32.

A locking member preferably in the form of a pin or lug 43 (see Fig. 6) is formed on the top 33 of the fitting 32 and is adapted to engage a corresponding locking member preferably a socket 44 provided in the flange 26 of the corner members of the table top.

The spring 34 is confined between the top 33 of the member 32 and the bolt 42 and normally urges the pin 43 into its socket or seat 44. This pin and socket engagement is caused by the spring urging the leg portion upwardly toward the top of the leg, movement of the leg portion being limited by the length of the diagonal slots 41. When the spring is arranged in the upper end of the leg with its free end 35 extending through the hole 36, tension is applied to the spring by pulling the free end 36 to contract the spring. The leg is then arranged between the arms 38, and the bolt 42 is inserted in place, after which the free projecting end of the spring is cut off. It is understood, of course, that the legs are pivoted in place and the end of the spring cut off before the table top is fastened in position. In order to release the pin 43 from its socket 44 the leg portion 31 is given a partial turn causing the leg portion to move back into the sleeve due to the engagement of the diagonal slots with the bolt 42. When the leg is released the spring again causes the leg portion to attain normal position, movement of the leg portion being limited by the vertical length of the diagonal slots. The leg is thereby always in position to be readily locked when it is in extended position, and is quickly unlocked by giving the leg portion 31 a partial turn.

Figure 4:
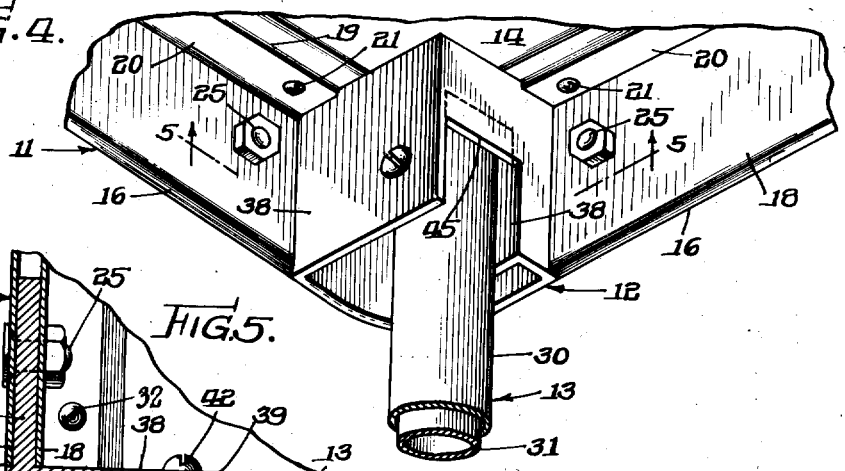
Fig. 4 is a detail perspective view of an inside corner as indicated by line 4—4 of Fig. 3.

A stop or shoulder 45, Fig. 4, is formed between the arms 38 and engages a part of the leg when the leg is in extended position to limit the movement thereof and to provide a bearing surface for steadying the leg when it is in extended position. The stop is properly spaced with reference to the pin and socket so that when the pin is in the socket there will be no chance of the sleeve to swing about its pivot. The pin 43 and the socket 44 may be provided with beveled sides, as clearly shown in Figs. 6 and 7, to permit free locking and unlocking engagement. Further, it will be noted that if the leg is swung outwardly to unfolded position without first manually rotating it to withdraw the projection 43 downwardly into the housing 30 against the action of spring 34, the projection 43 wil be engaged by flange 26 as it approaches the opening 44 and be automatically moved downwardly causing leg rotation against the compressing action of the spring until the projection reaches the opening 44, whereupon it will snap upwardly into position. That is, the locking action is automatic, the arrangement of parts 43 and shaping of flange 26 being such that the flange aids in moving the projection and rotating the leg against the action of the spring and in thereby guiding it into positon within opening 44.

It is understood, of course, that the sleeve 30 may be made polygonal instead of circular, as shown, and that the entire upper end of the leg may fit into a corresponding socket instead of using the smaller conical pin 43 engageable with the smaller socket 44.

Figure 2:
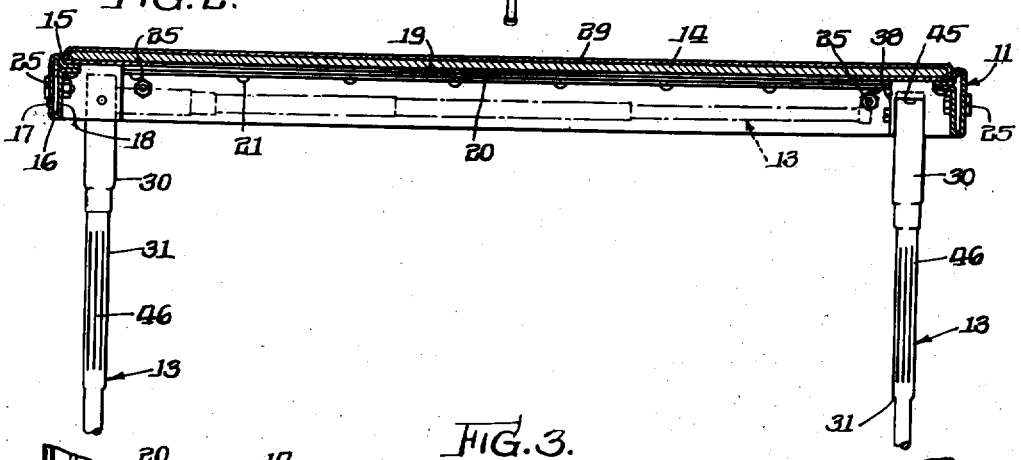
Fig. 2 is a detail sectional view on the line 2—2 of Fig. 1.
Figure 3:
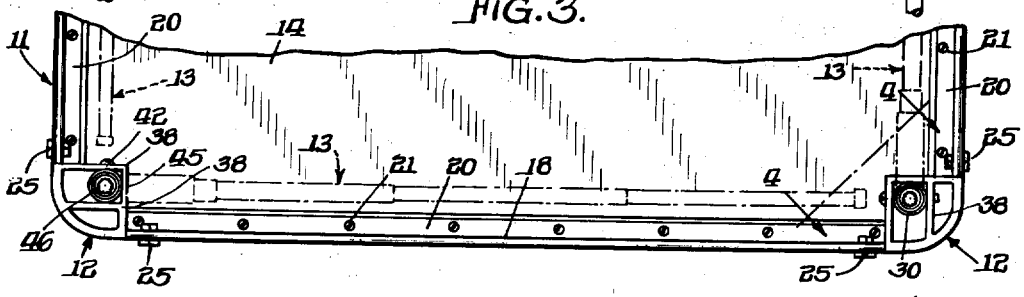
Fig. 3 is a detail bottom view.

The legs are provided with a decorative portion 46, Figs. 1 and 2, such as fluting or knurling, to decorate the legs and make the table more attractive and also to increase the firmness of the grip of the operator on the table leg to bring the pin 43 out of engagement with its socket.

The invention provides a table leg which is strong and durable in construction, which is efficient in operation, and which can be readily and economically manufactured. The legs automatically lock in position when extended and may be unlocked by giving a part of the leg a partial turn. The legs may be manufactured at a very low cost and may be readily manipulated for bringing them into locked or unlocked position. The method of constructing the legs inserting the springs in the legs and the locking feature of the legs relative to the top provides an easily operated rigid table which may be constructed of relatively few and simple parts.

Changes may be made in the form, construction and arrangement of the parts and the various steps in the method may be varied without departing from the spirit of the invention or sacrificing any of its advantages, and the right is hereby reserved to make all such changes as fairly fall within the scope of the following claims.

The invention is hereby claimed as follows:

1. A table comprising a leg, means on said leg engageable with a part of said table, means for normally urging the leg lengthwise, and means for bringing said first named means out of engagement with said part of said table and against the urging action when said leg is manually rotated a predetermined distance about its longitudinal axis.

2. A table comprising a pivoted leg, means including a spring for automatically locking said leg in extended position, and means for unlocking said leg against the tension of the spring upon turning movement of said leg about its longitudinal axis.

3. A table comprising a leg having a member thereon, spring means for normally urging said member outwardly, and means to cause rotative movement of the leg to produce longitudinal movement thereof.

4. A table comprising a socket member, a folding leg, means on said leg and engageable with said socket member when it is in extended position, means for urging said means toward the socket when the leg is extended, and means acting against the urging action of said last named means and withdrawing said first named means out of engagement with said socket member when the leg is twisted manually.

5. A table comprising a support, a leg pivoted to said support, spring controlled means for locking said leg in extended position, and means for unlocking said leg during axial turning movement of said leg.

6. A table comprising a support, a leg connected to said support, interengaging means on said leg and support, and means for preventing engagement of said interengaging means when axial turning movement is applied to said leg.

7. A table comprising a leg, a spring-pressed part extending from said leg, means engageable with said part when the leg is in extended position, and means for withdrawing said part out of engagement with said first named means when said leg is given a part turn axially.

8. A table comprising a frame, a leg support on said frame, a leg pivoted to said support, interengaging means on said support and leg when said leg is extended, means to limit the extending movement of said leg, and means for preventing engagement of said interengaging means when said leg is given a part turn axially.

9. In a table, a support, a leg comprising a sleeve portion and a main leg portion, pivot means passing through said leg and sleeve portion, a spring in said leg portion and confined between the top of said leg portion and said pivot means for normally urging said leg portion into said sleeve, means for moving said leg portion a predetermined distance out from said sleeve portion when said leg portion is given a part turn.

10. In a table, a support, a leg pivoted thereto and comprising a sleeve portion and a leg portion, said sleeve portion having round holes and said leg portion having diagonal holes, fastening means passing through said support and all of said holes, a spring in said leg portion and engaging the fastening means for normally urging said leg portion in one direction, said leg being movable vertically by limited rotation thereof.

11. A table having a support, a leg pivoted to said support and comprising a sleeve portion and a leg portion telescoping with said sleeve portion, fastening means through said support, leg and sleeve portions, a socket member, means for causing sad leg portion to seat in said socket member when extended, and means for unseating said leg portion from said socket member by turning said leg portion.

12. The method of fastening a member having a closed end to a second member and providing spring tension therebetween which consists in inserting a spring in the first member, providing a free end on said spring, returning the free end through the coils of said spring, providing a hole in the closed end, extending the free end through the hole, compressing said spring by pulling on said free end, passing fastening means through both of said members near the end of said spring away from said closed end, and finally cutting the free end of said spring and restricting said spring between the fastening means, and the closed end.

13. The method of confining springs in a member having a closed end which consists in providing a spring having a long returned end, providing a hole in said closed end through which the free end extends, compressing said spring by pulling on said free end, then passing means through said member to restrict said spring between the closed end and the last named means, and finally cutting off that part of the spring end which projects beyond the closed end of said member.

14. A table having a support, a sleeve pivoted to said support, a leg operatively connected to said sleeve, and means for urging said leg longitudinally relative to said sleeve.

15. A table having a support, a sleeve pivoted to said support, a leg operatively connected to said sleeve, means for urging said leg lengthwise relative to said sleeve, and means cooperating with the sleeve and leg for moving the leg inwardly relative to said sleeve when rotational movement is applied to said leg.

16. A table having a support, a sleeve pivoted to said support, a leg operatively connected to said sleeve, means for urging said leg lengthwise relative to said sleeve, means cooperating with the sleeve and leg for moving the leg inwardly relative to said sleeve when rotational movement is applied to said leg, and complementary means on said support and sleeve and engageable when the leg is in extended position.

17. A table having a support, a sleeve, a leg telescoping with said sleeve, said leg and sleeve having alined holes, a pivot member passing through said holes in the sleeve and leg and pivotally connecting said sleeve and leg to said support, and means for permitting telescopic action between said sleeve and leg.

18. A table having a support, a sleeve, a leg telescoping with said sleeve, pivot means for pivoting said sleeve to said support, said leg being provided with oppositely disposed diagonal slots through which the pivot member extends, and spring means engaging the pivot member and urging the leg lengthwise relative to said sleeve whereby rotational movement applied to said leg will telescope the leg within the sleeve.

19. In a table, a support, a sleeve, alined holes in said support and sleeve, a pivot pin extending through said alined holes for pivoting the sleeve to the support, a leg telescoping with said sleeve, said leg being provided with oppositely disposed inclined slots through which the pivot pin extends, and spring means engaging the leg and the pivot pin and tending to urge the leg from said sleeve whereby rotational movement imparted to said leg will retract the leg into the sleeve a predetermined distance.

20. A table comprising a leg, means pivotally, rotatively and slidingly mounting the leg relative to the table, and interengaging means between the table and leg, said interengaging means being disengaged when turning movement is applied to the leg whereby said leg will be moved longitudinally.

21. A table comprising a leg connected thereto for pivotal and longitudinal rotational movement, means on said leg engageable with a part of said table, means to urge the leg lengthwise of its connection and acting against said last named means, and means to cause said rotational movement to produce longitudinal movement of the leg.

22. A table comprising a top having a locking member, support means comprising a plurality of substantially co-axially arranged members associated for relative longitudinal movement, one of said members having a locking portion adapted to engage the locking member of the table top, resilient means for normally urging said portion into locking engagement with said cooperative locking member, one of said members being hollow and forming a housing for said resilient means, and manually actuated means for shifting said shiftable locking portion against the action of said resilient means.

23. A table comprising a top having a locking socket on its underside, means for supporting the table top including a hollow elongated sheet metal member pivoted to the underside of the table top to swing from a folded position adjacent the underside of the table to an erected position at right angles to the top, said supporting means including an elongated locking member shiftable in a direction longitudinally of and within said elongated sheet metal member into said locking socket to lock said supporting means in erected position, and spring means housed within said hollow elongated sheet metal member for normally urging said locking member along its own longitudinal axis into locking position with respect to said socket.

24. A table comprising a top, an elongated hollow support member movable with respect to the top from a position substantially in the plane of the top to a position at a substantial angle with respect thereto, a locking socket in the top, a locking projection carried by the support member wholly within the longitudinal limits thereof and movable longitudinally with respect thereto, resilient means for so moving the projection into the top locking socket as the support member is moved to said angular position, and stop means for limiting the movement of the locking projection with respect to the support member.

25. A table comprising a top, a support member movable with respect to the top from a position substantially in the plane of the top to a position at a substantial angle with respect thereto, a locking socket in the top, a locking projection carried by the support member and movable axially with respect thereto, resilient means for so moving the projection into the top locking socket as the support member is moved to said angular position, and manually operable cam means for withdrawing the projection from the locking socket against the action of the resilient means.

26. A table comprising a top, a support member movable with respect to the top from a position substantially in the plane of the top to a position at a substantial angle with respect thereto, a locking socket in the top, a locking projection carried by the support member and movable axially with respect thereto, resilient means for so moving the projection into the top locking socket as the support member is moved to said angular position, and manually operable rotatable cam means for withdrawing the projection from the locking socket against the action of the resilient means.

27. A table comprising a top, an elongated hollow support member movable with respect to the top from a position substantially in the plane of the top to a position at a substantial angle with respect thereto, a locking socket in the top, a locking projection carried by and within the support member and movable longitudinally with respect thereto, and a spring axially mounted within the support member along the line of movement of the locking projection for moving the projection through the longitudinal end of the support member into the top locking socket as the support member is moved to said angular position.

28. A table comprising a top, an elongated hollow support member movable with respect to the top from a position substantially in the plane of the top to a position at a substantial angle with respect thereto, a locking socket in the top, a locking projection carried by the support member within the longitudinal limits thereof and movable longitudinally with respect thereto, and an elongated coil compression spring longitudinally mounted within the support member along the line of movement of the locking projection for moving the projection through the longitudinal end of the support member into the top locking socket as the support member is moved to said angular position.

29. A table comprising a top, a support member pivotally movable with respect to the top from a position substantially in the plane of the top to a position at a substantial angle with respect thereto, a locking socket in the top, a locking projection member carried by the support member and movable axially with respect thereto, and resilient means for so moving the projection into the top locking socket as the support member is pivotally moved to said angular position, said support and locking members being mounted for pivotal movement with respect to the table top about an axis passing through both of said members.

JAMES E. BALES.
CARL T. CHRISTENSEN.